US012627200B1

(12) United States Patent
Askeland et al.

(10) Patent No.: US 12,627,200 B1
(45) Date of Patent: May 12, 2026

(54) OFFSHORE ELECTRICAL POWER GRID SYSTEMS

(71) Applicant: OneSubsea IP UK Limited, London (GB)

(72) Inventors: Audun Magne Askeland, Aksdal (NO); Bernt Helge Torkildsen, Bergen (NO); Arill S. Hagland, Bergen (NO); John Olav Fløisand, Radal (NO)

(73) Assignee: OneSubsea IP UK Limited, London (GB)

( * ) Notice: Subject to any disclaimer, the term of this patent is extended or adjusted under 35 U.S.C. 154(b) by 0 days.

(21) Appl. No.: 19/019,751

(22) Filed: Jan. 14, 2025

(51) Int. Cl.
| | |
|---|---|
| *H02K 7/18* | (2006.01) |
| *E21B 41/00* | (2006.01) |
| *H02J 3/32* | (2006.01) |
| *H02J 7/14* | (2006.01) |

(52) U.S. Cl.
CPC ....... H02K 7/1823 (2013.01); E21B 41/0085 (2013.01); H02J 3/32 (2013.01); H02J 7/1415 (2013.01)

(58) Field of Classification Search
CPC ...... H02K 7/1823; E21B 41/0085; H02J 3/32; H02J 7/1415
See application file for complete search history.

(56) References Cited

U.S. PATENT DOCUMENTS

| | | | |
|---|---|---|---|
| 9,476,487 | B2 | 10/2016 | Schoolcraft |
| 2014/0003963 | A1* | 1/2014 | Wessel ................ E21B 41/0007 417/44.1 |
| 2017/0159501 | A1* | 6/2017 | Brookman ............ F01K 21/045 |
| 2018/0298737 | A1* | 10/2018 | Landi .................... F03B 17/061 |
| 2022/0025739 | A1* | 1/2022 | Kloster ..................... F03D 9/28 |

* cited by examiner

*Primary Examiner* — Sean Gugger
(74) *Attorney, Agent, or Firm* — Kyle R. Miiller

(57) ABSTRACT

An electrical power grid may include generator circuitry, a motor, and a variable speed drive (VSD). The generator circuitry may include a turbine that may generate mechanical power based on a movement of a fluid, a generator coupled to the turbine that may generate electrical power based on the mechanical power, and the motor coupled to the generator that may perform an operation based on the electrical power. The VSD may be coupled to the generator and the motor. The VSD may drive the generator or the motor and receive a portion of the electrical power additional to an amount of electrical power consumption of the motor.

20 Claims, 4 Drawing Sheets

OFFSHORE ELECTRICAL POWER GRID SYSTEMS

BACKGROUND

The present disclosure generally relates to systems and methods for generating electrical power. More specifically, electrical power may be generated by harnessing a pressure of wind and/or pressure differential in the flow of oil, gas, and/or other reservoir fluids retrieved via a well to power wellsite operations and/or for export.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

As natural resources are extracted from reservoirs via wells, the extracted hydrocarbons may be transported to various types of equipment, tanks, processing facilities, and the like via transport vehicles, a network of pipelines, and the like. For example, hydrocarbons, such as oil and natural gas, may be extracted from the reservoirs via hydrocarbon wells and then be transported, via the network of pipelines, to various processing stations that perform various phases of hydrocarbon processing to make the produced hydrocarbons available for use or further transport.

Well equipment extracting and/or hydrocarbon transportation equipment may be disposed offshore and, in some cases, at subsea positions. In some applications, the well equipment is deployed at substantial offshore distances and/or depths, and thus electrical power may be transmitted over long distances to these offshore positions. The power transmission distances may have an adverse effect on the electrical power being delivered to the offshore and/or subsea equipment. Moreover, in some scenarios, the pressure of the hydrocarbons within the pipelines, such as output from a well, may be higher than some threshold for effective/viable transportation and/or for being input into one or more hydrocarbon processing systems. As such, at one or more locations along the pipeline(s), the pressure of the hydrocarbons may be reduced, such as via a choke valve, to allow for improved handling and/or processing of the hydrocarbons.

In some instances, the potential energy of the pressurized hydrocarbons prior to the choke or other pressure reducing devices may be large enough to harness for use with the well equipment. Thus, it may be beneficial to harness the potential energy associated with the pressure differential between the higher and lower pressure sections of the pipeline.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION

Figure 1:
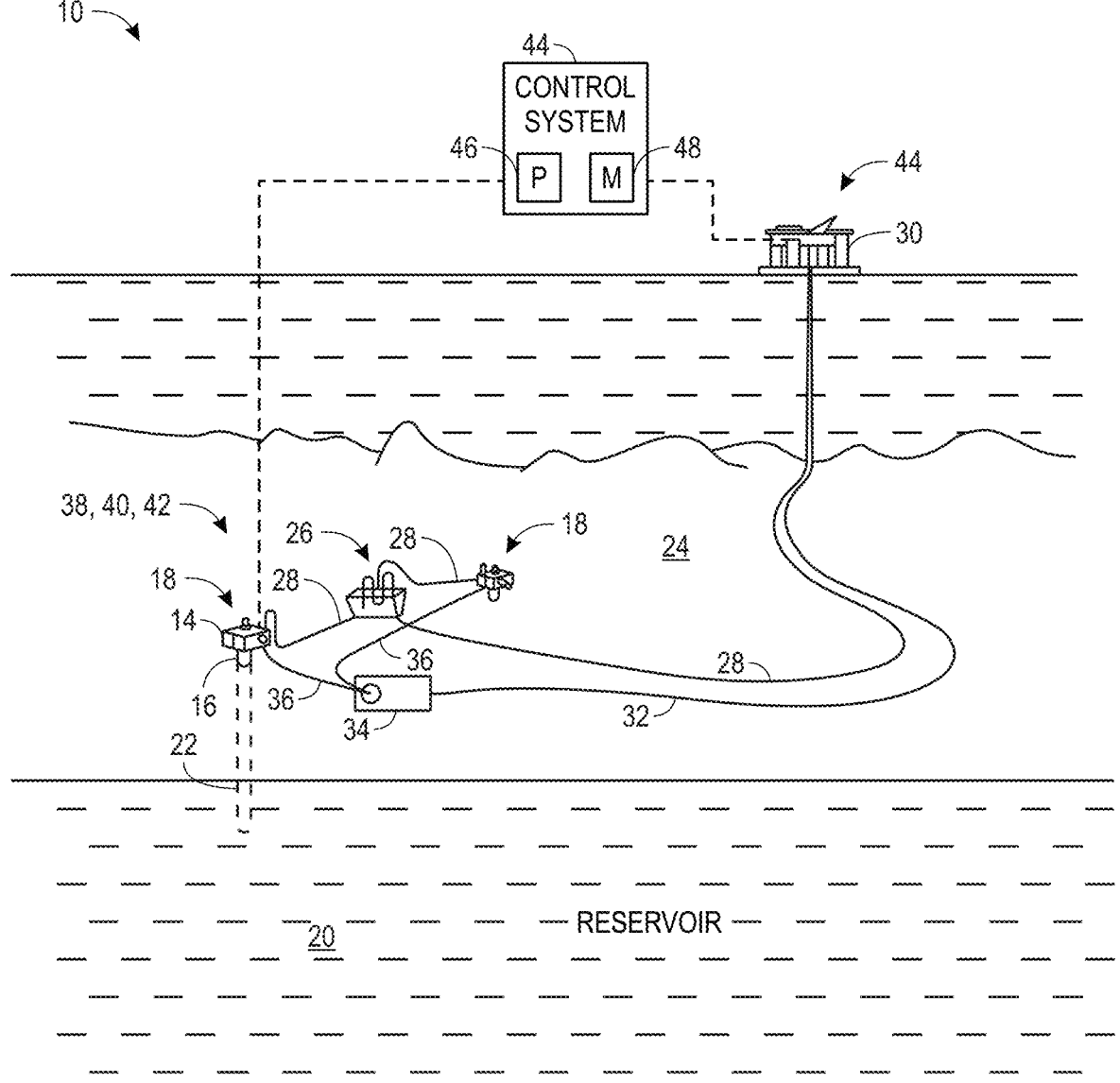
FIG. 1 is a schematic view of a subsea production system for extracting a reservoir fluid, according to embodiments of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled) and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

The present disclosure is generally directed toward systems and methods for electrical power generation and delivery of subsea production systems. Reservoir fluids, such as oil, natural gas, other hydrocarbons, etc., may be obtained from subterranean or subsea geologic formations, often referred to as reservoirs, by drilling one or more wells that penetrate the sea floor into the geologic formation. In subsea production systems, various types of infrastructure and equipment may be positioned offshore, such as underwater along a sea floor and/or on a surface of the sea to aid in retrieving the hydrocarbon fluids. The extracted reservoir fluids may be transported (e.g., via one or more pipelines) from the well(s) to various types of equipment, tanks, processing facilities, and the like.

As mentioned above, in some scenarios, the pressure of the reservoir fluid, in liquid, gas, or mixed state, within the pipelines, such as output from a well, may be higher than some threshold value for effective transportation and/or for being input to one or more processing systems. Moreover, well equipment deployed at substantial offshore distances and/or depths may use electrical power to operate. As such, at one or more locations along a flowline (e.g., pipeline) from a well, a portion of the pressure of the reservoir fluid may be harnessed to generate electrical power.

In some embodiments, the subsea production system may include a valve, such as a choke valve, to harness a portion of the pressure of the reservoir fluid within a flowline. The choke valve may create a pressure differential between different portions (e.g., before and after the choke valve) of the flowline. The subsea production system may include subsea generator circuitry including a turbine and a generator to generate electrical power based on the pressure differential.

The turbine (e.g., a turboexpander) may utilize the pressure differential to generate mechanical power. A primary flow path of the reservoir fluid from a well to one or more processing systems may include a choke valve or other pressure reducing device, and a parallel flow path (e.g., parallel to the primary flow path and bypassing the choke valve) may include the turbine. Alternatively or additionally, the turbine and the choke valve may be disposed on the primary flow path (e.g., a single flow path). The turbine may utilize a liquid movement/flow and/or a gas movement/flow of the reservoir fluid through the flow path to generate the mechanical power. For example, the turbine may convert the potential energy of the pressure differential to mechanical energy. Moreover, the turbine may be coupled to or integrated with the generator to produce electrical power from the mechanical power generated by the turbine. In some embodiments, the turbine, the generator, or both may be disposed underwater along a sea floor (e.g., subsea) or on a surface of the sea.

In some embodiments, the generator may deliver the electrical power to offshore motors of the subsea production system. The offshore motors may include subsea actuators (e.g., electrical actuators) located on trees (e.g., subsea injection or production trees, etc.), manifolds (e.g., subsea injection or production manifolds), and/or substations (e.g., subsea boosting stations). Moreover, in some embodiments, the offshore motors may include motors on the surface of the sea, for example, disposed on surface platforms of the subsea production system. Additionally, while the turbine provides power generation when the pressure differential is higher than some threshold or is otherwise desired, in some embodiments, the turbine may be operated as an offshore motor to provide compression operations to the reservoir fluid to increase the pressure differential.

The subsea production system may include a variable speed drive (VSD) (e.g., a frequency converter) to selectively supply electrical power to and receive electrical power from the turbine, one or more of the offshore motors, or both. The VSD may supply or receive the electrical power during an initial phase of movements (break-out torque) and/or normal operations of the turbine, one or more of the offshore motors, or both. Moreover, the VSD may adjust a frequency or a rate of electrical power flow (e.g., voltage or current signal) between the subsea generator circuitry and the offshore motors. That is, the VSD may improve a balance of electrical power generation of the subsea generator circuitry with electrical power consumption of the offshore motors. For example, the VSD may include one or more energy storage units (e.g., batteries) and a number of switches (e.g., solid-state switches) to supply the electrical power and/or adjust the electrical power flow.

In some embodiments, a control system of the subsea production system may generate control signals to perform one or more operations by the subsea production system. The operations may include initiating movements of the turbine and/or the offshore motors, adjusting the frequency or the rate of electrical power flow between the subsea generator circuitry and the offshore motor, among other operations. For example, the control system may output the control signals to open and close the switches of the VSD. Additional details with regard to harnessing the pressure differential in a flowline to generate energy will be discussed below with reference to FIGS. 1-4.

By way of introduction, FIG. 1 is a schematic view of a subsea production system 10 for extracting a reservoir fluid, according to embodiments of the present disclosure. As should be appreciated, the subsea production system 10 is provided as an example production system. The subsea production system 10 may be implemented separately or in conjunction with other subsea and/or land-based production systems.

In some embodiments, the subsea production system 10 may include a subsea tree 14 coupled to a wellhead 16 to form a subsea station 18 that extracts reservoir fluid, such as oil and/or natural gas, in a reservoir 20 via a well 22 drilled into a geological formation 24 (e.g., ocean floor, ground, etc.). The well 22 may include one or more pumps to extract reservoir fluid from the reservoir 20. As should be appreciated, the subsea production system 10 may include multiple subsea stations 18 that extract reservoir fluid of the reservoir 20 via respective wells 22. In some embodiments, the reservoir fluid is directed from the subsea tree(s) 14 to a pipeline manifold 26 via one or more flowlines 28, and the pipeline manifold 26 may connect (e.g., via one or more flowlines 28) to a surface platform 30.

In some embodiments, the surface platform 30 may include a floating production, storage, and offloading unit (FPSO) or a shore-based facility. Moreover, in some embodiments, the surface platform 30 may be an offshore production platform having one or more wells 22 extending therefrom through the water and into the geological formation 24. In addition to flowlines 28 that carry the reservoir fluid away from the wells 22, the subsea production system 10 may include lines or conduits 32 that supply fluids, as well as carry control and data lines to the subsea equipment. These conduits 32 may connect to a distribution module 34, which in turn couples to the subsea stations 18 via supply lines 36.

The subsea production system 10 may include a number of motors 38 (e.g., offshore motors). The subsea tree 14, the wellhead 16, the subsea stations 18, the well 22 (or pumps of the well 22), the pipeline manifold 26, the one or more flowlines 28, the surface platform 30, one or more of the conduits 32, the distribution module 34, one or more of the supply lines 36, or one or more sensors, among other possibilities may include the motors 38. In some embodiments, a motor 38 may include electronics, an electrical drive, and actuator mechanics. The electrical drive may include a direct current (DC) motor, an alternating current (AC) motor, a servomotor, a linear drive, a rotary drive, or any combination thereof, among other possibilities. The actuator mechanics may include a transmission, a gear assembly or gearbox, one or more shafts, a rotary to linear converter, a position lock, a position sensor, or any combination thereof, among other possibilities. Moreover, the electronics may include power electronics and a controller (e.g., control board, processor, memory, instructions, and communication circuitry).

In some embodiments, the motors 38 may receive electrical power to drive various flow control equipment, such as valves, pumps, water injection systems, chemical injection systems, or any combination thereof. For example, the valves may include gate valves, ball valves, blowout preventers (BOPs), chokes, and the like. Moreover, the water and chemical injection systems may include valves, pumps, flowmeters, and other flow control equipment. In alternative or additional embodiments, the motors 38 may drive a variety of sensors or monitoring equipment, such as flow meters, temperature sensors, pressure sensors, water sensors, fluid composition sensors, leak sensors, or any combination thereof. Each of the foregoing components and/or the respective motors 38 may be disposed subsea or on the surface of the sea, for example, on the surface platform 30.

The subsea production system 10 may include generator circuitry 40 (e.g., offshore generator circuitry, subsea generator circuitry). The generator circuitry 40 may be coupled to the motors 38. In some embodiments, generator circuitry 40 may include a turbine and a generator coupled to the turbine. The reservoir fluid extracted from the reservoir 20 may be pressurized with respect to the environment (e.g., atmosphere, subsea, etc.) of the well 22. While at least a portion of such pressure may be desired to be maintained (e.g., to assist production flow), the pressure may be greater than some threshold pressure associated with the operation of other components of the production system 10.

To capitalize on this excess pressure, the turbine of the generator circuitry 40 may be disposed along, within, or adjacent to one or more flowlines 28 between the well 22 and a lower pressure portion of the production system 10 to produce electrical power and drive various equipment, such as the motors 38. For example, blades of the turbine may be positioned within a portion of the flowline 28 that includes a pressure differential. Based on the fluid flow of the hydrocarbons caused by the pressure differential, the blades of the turbine may cause the rotation of a connected turbine rotor. The generator connected to the turbine rotor may produce electrical power based on the mechanical power generated associated with a rate of rotation of the turbine rotor. The generator circuitry 40 may then provide the electrical power to power one or more portions of the subsea production system 10, such as the motors 38, and/or a power grid, such as a land-based power grid (e.g., municipal infrastructure).

In some cases, the pressure of the reservoir fluid being extracted and/or the pressure differential (and fluid flow therebetween) across or through blades of the turbine may be equal to or below a low-pressure threshold (or a low pressure differential threshold) or equal to or above a high pressure threshold (or a high pressure differential threshold). Alternatively or additionally, the pressure of the reservoir fluid being extracted may change (e.g., fluctuate) across time. For example, the pressure of the reservoir fluid and/or the pressure differential across the turbine may intermittently become equal to or below the low-pressure threshold (or the low-pressure differential threshold) or equal to or above the high-pressure threshold (or the high-pressure differential threshold). As such, the rotation speed or rotation frequency of the turbine rotor may be (e.g., intermittently become) equal to or below a low rotation frequency threshold or equal to or above a high rotation frequency threshold. The low-pressure threshold (or the low-pressure differential threshold) and the high-pressure threshold (or the high-pressure differential threshold) may be based on an amount of electrical power consumption of the motors 38.

In such cases, the generator may produce the electrical power with varying rates and/or frequencies based on the varying rotation speed or rotation frequency of the turbine rotor across time. For example, the generator may produce a surplus amount of electrical power compared to electrical power consumption of the motors 38 when the rotation frequency of the turbine rotor is equal to or above the high rotation frequency threshold. Moreover, the generator may produce a lower amount of electrical power compared to electrical power consumption of the motors 38 when the rotation frequency of the turbine rotor is equal to or below the low rotation frequency threshold. The high rotation frequency threshold and the low rotation frequency threshold of the turbine may be based on the amount of electrical power consumption of the motors 38. In such cases, a variable speed drives (VSD) 42 of the subsea production system 10 may receive the surplus electrical power and supply additional electrical power to improve a balance of electrical power generation of the generator circuitry 40 with electrical power consumption of the motors 38.

The subsea production system 10 may include a number of the VSDs 42 (e.g., a frequency converter). The VSD 42 may be disposed subsea or on the surface of the sea, for example, on the surface platform 30. In some embodiments, the VSD 42 may be disposed at or near the subsea tree 14, the wellhead 16, the subsea stations 18, the well 22 (or pumps of the well 22), the pipeline manifold 26, the one or more flowlines 28, the surface platform 30, one or more of the conduits 32, the distribution module 34, one or more of the supply lines 36, or one or more sensors, among other possibilities. The VSD 42 may be coupled to the motors 38 and the generator circuitry 40. In some embodiments, the motors 38, generator circuitry 40, and VSD 42 may form an electrical power grid. Although the motors 38, generator circuitry 40, and VSD 42 are shown offshore and/or at subsea levels, it should be appreciated that the embodiments herein may similarly be incorporated by onshore motors 38, generator circuitry 40, and/or VSD 42. Moreover, it should also be appreciated that in some embodiments, the VSD 42 may be coupled to the motor 38 and/or the generator circuitry 40 via step-up and/or step-down transformers.

In some embodiments, the VSD 42 may supply electrical power during an initial phase of movements (break-out torque) of the turbine, one or more of the offshore motors, or both. Moreover, the VSD 42 may adjust a rate of electrical power flow between the generator circuitry 40 and the motors 38. The VSD 42 may include one or more energy storage units (e.g., batteries) and a number of switches (e.g., solid-state switches). For example, the VSD 42 may be coupled to an external power grid, such as an additional subsea generator circuitry and/or a land-based power grid.

It should be appreciated that the pressure differential across the turbine (e.g., turbine blades) of the generator circuitry 40 may change across time. As such, a rate of electrical power generation of the generator circuitry 40 may change over time. Moreover, the electrical power consumption of the motors 38 may change over time. For example, a subsea component driven by the motors 38 may switch off, switch on, or switch to a different operating mode changing the electrical power consumption of the motors 38. In some cases, the VSD 42 may improve a balance of the electrical power generation of the generator circuitry 40 with the electrical power consumption of the motors 38.

In some cases, the VSD 42 may supply additional electrical power from the one or more energy storage units and/or the external power grid in response to the electrical power consumption of the motors 38 being higher than the electrical power being produced by the generator circuitry 40. In such cases, the motors 38 may receive the additional electrical power provided by the VSD 42 in lieu of or in addition to the electrical power produced by the generator circuitry 40. Alternatively or additionally, the VSD 42 may receive a surplus of the electrical power produced by the generator circuitry 40. For example, the VSD 42 may input a portion of the electrical power in response to a rate of electrical power consumption of the motors 38 being lower than a rate of electrical power generation of the generator circuitry 40. In some embodiments, the VSD 42 may supply the surplus electrical power to the one or more energy storage units and/or the external power grid. Accordingly, the VSD 42 may improve a balance of the electrical power generation of the subsea generator circuitry with the electrical power consumption of the motors 38.

With the foregoing in mind, control and monitoring of the subsea conditions and operations, as well as those on the surface platform 30 may be performed via one or more controllers or control systems 44. The control system 44 may include one or more processors 46 and memory 48. The processors 46 may execute programs, instructions, and/or routines stored in any suitable article of manufacture that includes one or more tangible, computer-readable media. The tangible, computer-readable media may include the memory 48. The memory 48 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor (s) 46 to enable the control system 44 perform various functions. For example, the memory 48 may be read-only memory (ROM), random-access memory (RAM), flash memory, an optical storage medium, or a hard disk drive, to name a few examples. Furthermore, the processor(s) may include any suitable computing circuitry such as general-purpose microprocessors, application specific integrated circuits (ASICs), field programmable gate arrays (FPGAs), or any combination thereof.

The control system 44 may be disposed on the surface platform 30, at one or more subsea locations such as on or near the subsea stations 18, or a combination thereof, among other possibilities. The control system 44 may be coupled to the subsea tree 14, the wellhead 16, the subsea stations 18, the well 22 (or pumps of the well 22), the pipeline manifold 26, the one or more flowlines 28, the surface platform 30, one or more of the conduits 32, the distribution module 34, one or more of the supply lines 36, the motors 38, the generator circuitry 40, the VSD 42, one or more sensors, or a combination thereof, among other possibilities.

The control system 44 may generate control signals to control and monitor one or more operations of the subsea production system 10. The control system 44 may selectively control the electrical power supplied via the generator circuitry 40 to power the motors 38. For example, the control system 44 may monitor the electrical power generation of the generator circuitry 40. A rate of electrical power generation of the generator may be based on the rate of rotation of the blades of the turbine, which in turn may be based on an extraction rate of the reservoir fluid from the reservoir 20. The control system 44 may receive signals indicative of an extraction rate of the reservoir fluid, the rate of rotation of the turbine corresponding to the mechanical power generation of the turbine, the electrical power generation of the generator, and/or the electrical power consumption of the motors 38, or any combination thereof. The control system 44 may generate (e.g., calculate) the low-pressure threshold (or the low-pressure differential threshold), the high pressure threshold (or the high pressure differential threshold), the low rotation frequency threshold, and/or the high rotation frequency threshold, for example, based on the received signals.

Moreover, the control system 44 may generate control signals to control and/or adjust various aspects of the subsea production system 10, for example, based on the received signals and/or determined thresholds mentioned above, among other things. The control system 44 may generate control signals to control a rate or speed of the pumps to adjust the extraction rate of the reservoir fluid from the reservoir 20. The control system 44 may generate control signals to adjust open and close the switches of the VSD 42 to input the surplus electrical power of the generator circuitry 40 and output the additional electrical power to the motors 38. Moreover, the control system 44 may communicate control signals with the electronics of the motors 38 to operate the electrical drive and/or the actuator mechanics of the motors 38. In some embodiments, the control system 44 may include the electronics of the motors 38. As such, the control system 44 may generate control signals to switch off, switch on, and switch an operation mode of one or more of the motors 38 and/or the subsea components driven by the motors 38.

Figure 2:
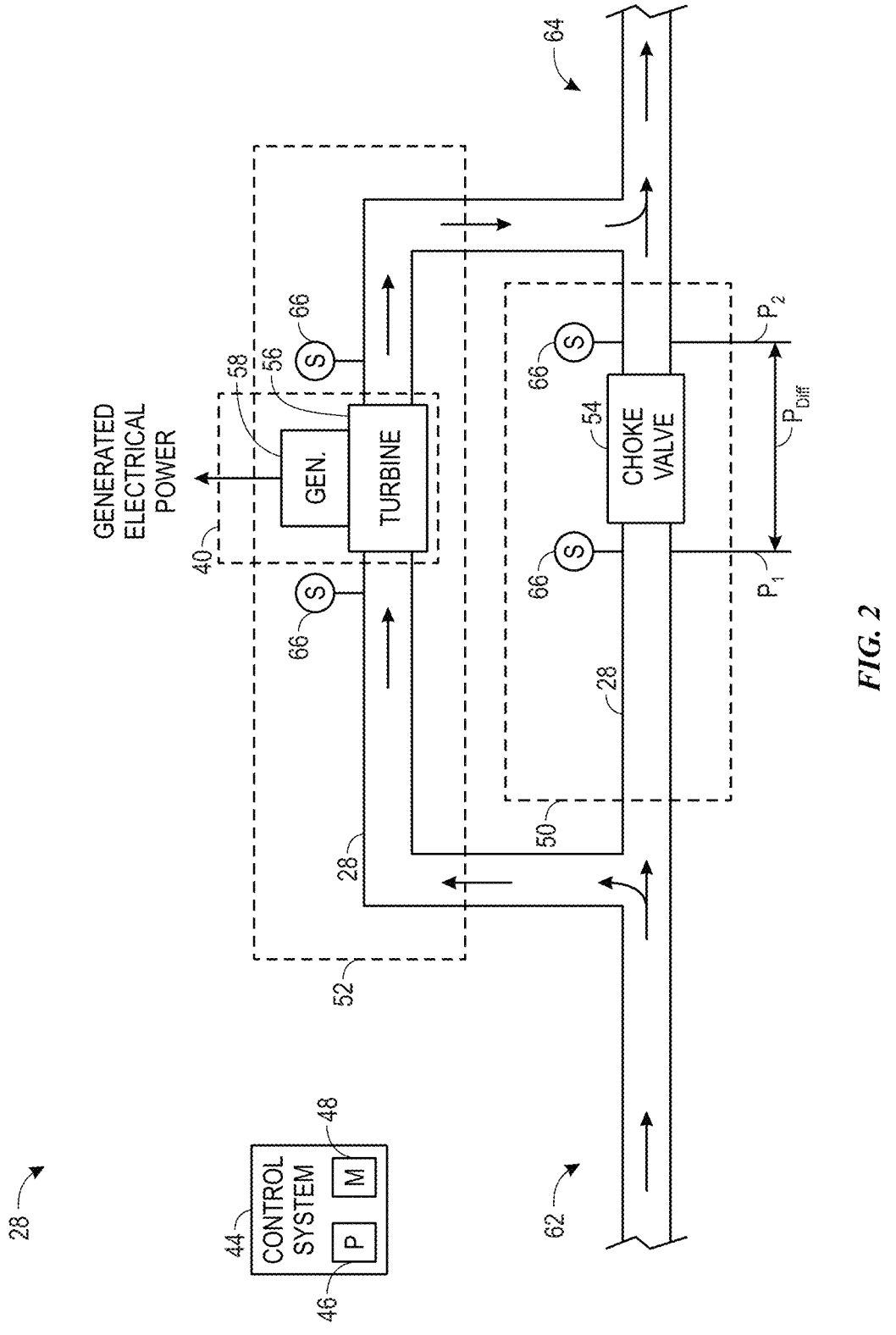
FIG. 2 is a schematic view of a portion of a flowline of the subsea production system of FIG. 1 having subsea generator circuitry, according to embodiments of the present disclosure.

FIG. 2 is a schematic view of a portion of the flowline 28 of the subsea production system 10, including a primary flow path 50 and a parallel flow path 52 having the generator circuitry 40, according to embodiments of the present disclosure. As discussed herein, it may be desired to supply reservoir fluid to one or more fluid processing systems (e.g., for refinement, transportation, etc.). However, the pressure of the reservoir fluid from the well 22 may be higher than a desired threshold. As such, in some embodiments, any viable pressure reducing fitment such as an in-line control valve or a choke valve 54 may be disposed along the primary flow path 50 of the flowline 28. Although embodiments discussed herein include the choke valve 54, it should be appreciated that in alternative or additional embodiments, any other viable pressure reducing fitment may replace or supplement the choke valve 54.

The choke valve 54 may provide an adjustable pressure drop between the inlet 62 of the portion of the flowline 28 (e.g., from the well 22) and an outlet 64 of the portion of the flowline 28 (e.g., to fluid processing systems, transportation systems, etc.). The choke valve 54 may be any suitable type of choke valve 54 and may be electronically or manually actuated. Moreover, as should be appreciated, although discussed herein as a choke valve 54, any suitable pressure or flow control valve may be utilized to regulate flow through the primary flow path 50 and/or the parallel flow path 52.

A pressure differential, PDiff (e.g., P1-P2), across the choke valve 54 in the primary flow path 50 causes a pressure differential along the parallel flow path 52. In the depicted embodiment, the generator circuitry 40 may be disposed along the parallel flow path 52 of the flowline 28. It should be appreciated that in alternative or additional embodiments, the generator circuitry 40 may be disposed on the primary flow path 50. For example, the generator circuitry 40 may be disposed in series with the choke valve 54. In yet alternative or additional embodiments, the flowline 28 may omit the choke valve 54. In such embodiments, the generator circuitry 40 may cause the pressure differential PDiff.

The generator circuitry 40 may include a turbine 56 and a generator 58. The turbine 56 (e.g., a turboexpander) may be energized due to the flow through the parallel flow path 52 motivated by the pressure differential. The turbine 56 may include an outer casing, a rotor disposed inside the outer casing, one or more bearings (e.g., magnetic bearings), and a plurality of turbine blades coupled to the rotor along an internal flow path (e.g., expanding flow path) through the turbine 56 from an inlet to an outlet. In certain embodiments, the turbine 56 may include one or more stages of the turbine blades.

The reservoir fluid flowing along the parallel flow path 52 may flow against and between the turbine blades along the internal flow path to drive rotation of the rotor, thereby generating mechanical energy (e.g., mechanical power) while expanding and reducing the pressure of the reservoir fluid. The flow rate of the reservoir fluid through the turbine 56 may correspond to the rate of rotation of the turbine rotor, which in turn may correspond to a rate of mechanical power production of the turbine 56. Moreover, the generator 58 may convert the mechanical energy of the turbine 56 to electrical power. The generator 58 may be mechanically coupled to and rotated by the rotor of the turbine 56. As should be appreciated, any suitable turbine 56 may be utilized to convert the pressure differential into mechanical (and electrical, via the generator 58) energy.

For example, in some embodiments, the turbine 56 may be a straight or a diagonal inflow turbine with or without a shroud (e.g., for axial pressure balancing). In specific embodiments, the turbine 56 may be hermetically sealed from the reservoir fluid or an in-line. In such embodiments, the reservoir fluid may be able to flow through internal pathways (e.g., for bearing lubrication, cooling, etc.) of the turbine 56. Furthermore, while shown as a single turbine 56, in some embodiments, multiple turbines 56 may be disposed in series and/or in parallel (e.g., multiple parallel flow paths 52 and/or multiple turbines 56 in parallel within a single parallel flow path 52) to capture the potential energy of the pressure differential.

By way of example, the pressure differential between the inlet 62 and the outlet 64 may be larger than the operating pressure differential of a single turbine 56, and the operating pressure differential of multiple turbines 56 (e.g., in parallel or series) may sum (e.g., according to a series or parallel summation) to the total pressure differential. Additionally, while shown as a turbine 56 with the generator 58 being coupled thereto, in some embodiments, the generator 58 may be integrated with the turbine 56. For example, a turbine rotor may include magnets or windings such that rotation of the turbine rotor generates electric power without a separate generator 58. Alternatively or additionally, the generator 58 may include the magnets or windings (e.g., a stator) disposed separately and coupled to the turbine 56 to generate the electric power based on the mechanical power associated with the rotation of the turbine rotor.

In some embodiments, the control system 44 may receive feedback from one or more sensors 66 disposed at different locations on the flowline 28 based on which the pressure of the reservoir fluid exiting the primary flow path 50 may be regulated (e.g., via the choke valve 54). The sensors 66 may include pressure sensors, temperature sensors, flow meters, spectral sensors (e.g., to determine a composition of the reservoir fluid), water or moisture sensors, etc. The turbine 56 may include one or more sensors 66 therein and/or be utilized to output sensor feedback. As mentioned above, the rate of rotation of the turbine rotor may be proportional to a rate of mechanical power production of the turbine 56. In turn, the rate of mechanical power production of the turbine 56 may correspond to the rate of electrical power production of the stator (e.g., the windings, the magnets) of the generator 58. The turbine 56 may have a rotation sensor (e.g., rotations per minute (RPM) sensor) and/or an electrical sensor measuring mechanical power output of the turbine 56 and/or the electrical power output of the generator 58, which may be used to determine the flow rate of the reservoir fluid.

The turbine 56 may have a desired operating range for the flow rate or pressure differential of the reservoir fluid passing therethrough. In some cases, the pressure differential or flow rate of the reservoir fluid may be equal to or below the low-pressure threshold (or the low-pressure differential threshold) or equal to or above the high-pressure threshold (or the high pressure differential threshold). Alternatively or additionally, the pressure of the reservoir fluid being extracted may change (e.g., fluctuate) over time. The pressure differential or flow rate of the reservoir fluid may intermittently become equal to or below the low-pressure threshold (or the low-pressure differential threshold) or equal to or above the high-pressure threshold (or the high-pressure differential threshold).

In such cases, the generator 58 may produce the electrical power with varying rates and/or frequencies based on the varying rotation speed or rotation frequency of the rotor of the turbine 56 across time. For example, the generator 58 may produce a surplus amount of electrical power additional to a high electrical power generation rate threshold based on an increase in the rotation frequency of the rotor for a first time duration. Moreover, the generator 58 may produce a lower amount of electrical power compared to a low electrical power generation rate threshold based on a decrease in the rotation frequency of the rotor for a second time duration.

In some embodiments, the control system 44 may generate control signals to instruct removing the surplus electrical power or supplying additional electrical power. As such, the control system 44 may maintain the electrical power production of the generator 58 within a desired range. For example, the control system 44 may maintain the electrical power production of the generator 58 between the high electrical power generation rate threshold and the low electrical power generation rate threshold. Alternatively or additionally, the control system 44 may control the choke valve 54 to adjust (e.g., based on feedback from the sensors 66) the pressure differential or flow rate to increase the efficiency and/or efficacy of the turbine 56 and/or the generator 58. As such, the rotation speed or rotation frequency of the rotor of the turbine 56 may be (e.g., intermittently become) equal to or below the low rotation frequency threshold or equal to or above the high rotation frequency threshold.

As mentioned above, the control system 44 may receive control signals feedback from one or more sensors 66 disposed at different locations on the flowline 28. The control system 44 may determine an extraction rate of the reservoir fluid, the rate of rotation of the turbine 56 corresponding to the mechanical power generation of the turbine 56, the electrical power generation of the generator 58, and/or the electrical power consumption of the motors 38, or any combination thereof based on the control signals. In some embodiments, the control system 44 may store or determine the high electrical power generation rate threshold, the low electrical power generation rate threshold, the low-pressure threshold, the low pressure differential threshold, the high pressure threshold, the high pressure differential threshold, the low rotation frequency threshold, the high rotation frequency threshold, and the like. The control system 44 may retrieve or determine the aforementioned thresholds based on receiving an amount of electrical power consumption of the motors 38 discussed above with respect to FIG. 1. For example, the control system 44 may calculate the thresholds or retrieve the thresholds from a lookup table. In some embodiments, the memory 48 may store the lookup table. Alternatively or additionally, the control system 44 may retrieve the lookup table or an entry of the lookup table stored in an external memory via one or more communication buses and/or wireless networks based on the amount of electrical power consumption of the motors 38.

While shown as disposed in the parallel flow path 52, in some embodiments, the turbine 56 may be in series with one or more choke valves 54. As should be appreciated, the portion of the flowline 28 that includes the turbine 56 may be located along any suitable portion of the flowline 28 where a pressure differential is desired or affordable. Alternatively or additionally, the portion of the flowline 28 including the turbine 56 may be disposed in the subsea tree 14, the pipeline manifold 26, and/or the surface platform 30 to name a few. Moreover, in some embodiments, the turbine 56 may be located on a skid of the surface platform 30. Furthermore, the turbine 56 may be disposed in any suitable orientation (e.g., horizontally, vertically, or an angle therebetween) depending on implementation.

Additionally, while the turbine 56 provides for power generation when the pressure differential is greater than needed or otherwise desired, in some embodiments, the turbine 56 may be operated as a compressor or a pump (e.g., a motor 38) to provide an increase to the pressure differential between the inlet 62 and outlet 64. In such embodiments, the turbine 56 may receive (e.g., consume) electrical power to operate as a compressor or a pump. In other words, the turbine 56 may operate in a power generation mode and a compressor mode depending on circumstance, and the mode of operation may be set via the control system 44.

By way of example, the turbine 56 may initiate extraction of the reservoir fluid by operating as a compressor or a pump to provide an initial pressure and/or pressure differential. Moreover, at early stages of production from the reservoir 20 shown in FIG. 1 (e.g., after initiating the extraction), the pressure from the well 22 may be higher, and the turbine 56 may be used in a power generation mode. Furthermore, the pressure may be lower at later stages of production, and the turbine 56 may be used in a compressor mode. As such, the turbine 56 may provide power generation when the pressure differential is higher than desired and boost the pressure by using the generator 58 as an electric motor to drive the turbine 56 as a motor 38. For example, the turbine 56 may operate as or similar to a turboexpander/compressor, as described in U.S. Pat. No. 9,476,487, which is hereby incorporated by reference.

Figure 3:
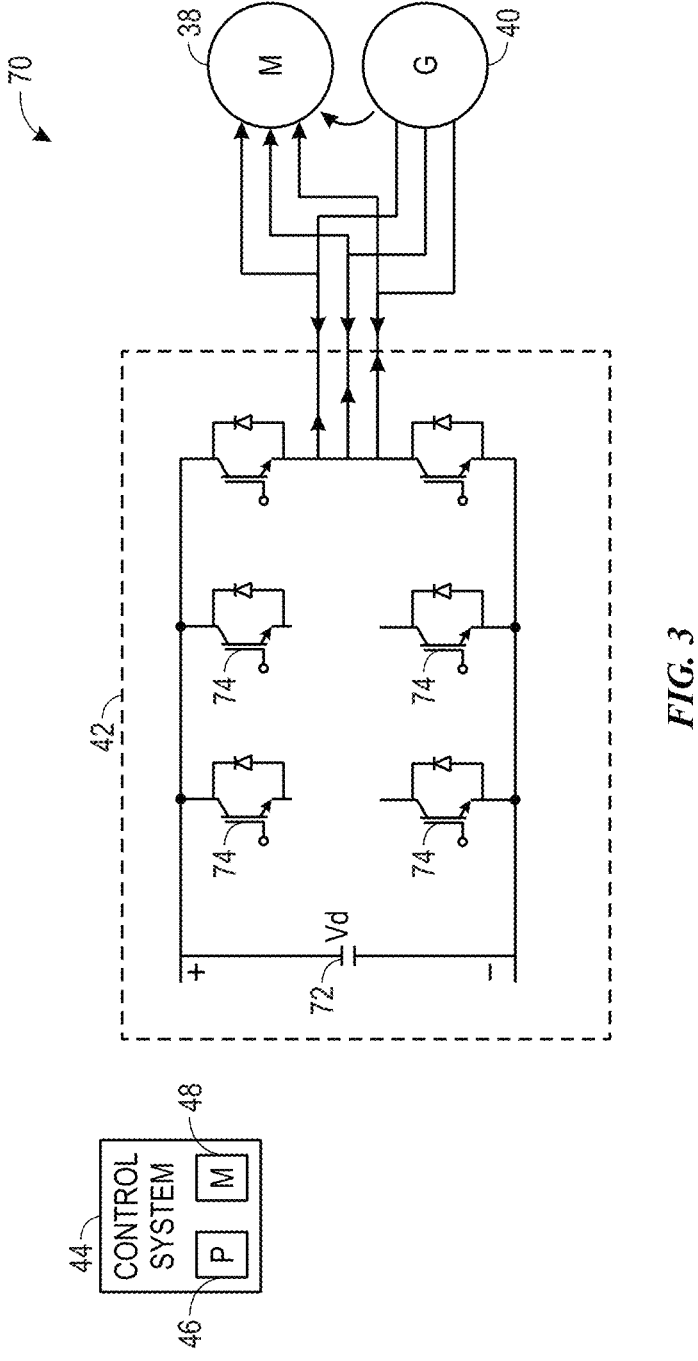
FIG. 3 is a schematic view of an offshore electrical power grid of the subsea production system of FIGS. 1 and 2 including offshore motors, the subsea generator circuitry of FIG. 2, and a variable speed drive, according to embodiments of the present disclosure.

FIG. 3 is a schematic view of an electrical power grid 70 of the subsea production system 10 including the motors 38, the generator circuitry 40, and the VSD 42, according to embodiments of the present disclosure. In some embodiments, the generator circuitry 40 may be disposed at the primary flow path 50 and/or the parallel flow path 52 of the flowline 28 discussed above. The VSD 42 may be coupled to the motors 38 and the generator circuitry 40. As mentioned above, the motors 38 may include electronics, electrical drives, and/or actuator mechanics. For example, a motor 38 may drive a respective component. Moreover, the control system 44 may be communicatively coupled to the motors 38, the generator circuitry 40, and the VSD 42 via one or more communication buses, wireless networks, or both.

The VSD 42 may include one or more energy storage units 72 (e.g., batteries, Vd) and a number of switches 74 (e.g., solid-state switches) to supply the electrical power and/or adjust the electrical power flow within the electrical power grid 70. The control system 44 may generate control signals to operate the switches 74 as a frequency convertor circuit. For example, the control system 44 may open and close the switches 74 with a desired speed to convert an AC signal, for example, the surplus electrical power (e.g., active power) generated by the generator circuitry 40 to a DC signal for storage on the storage unit 72. The surplus electrical power may correspond to an amount of additional electrical power generation by the generator circuitry 40 compared to the electrical power consumption of the motors 38.

Moreover, the control system 44 may open and close the switches 74 with a desired speed to convert a DC signal of the storage unit 72 to an AC signal with a desired frequency. In some cases, the VSD 42 may output the AC signal with the desired frequency having an active and/or reactive power to drive the motors 38 and/or the generator circuitry 40 to initiate extraction of the reservoir fluid. In alternative or additional cases, the VSD 42 may output the AC signal with the desired frequency having the active and/or reactive power to drive the motors 38 in response to the electrical power generation of the generator circuitry 40 being equal to or below the electrical power consumption of the motors 38 and/or a low electrical power generation rate threshold.

In alternative or additional cases, the VSD 42 may output the AC signal with the desired frequency having reactive power to adjust an operating frequency of the electrical power grid 70. For example, the control system 44 may receive control signals feedback from one or more sensors disposed at various locations of the electrical power grid 70 to determine an operating frequency of the AC signal generated by the generator circuitry 40 or the AC signals being delivered to the motors 38. The control system 44 may adjust the operating frequency of the electrical power grid 70 via the VSD 42 and based on comparing the received/determined operating frequency of the with the desired frequency (or a desired frequency range).

With the foregoing in mind, it should be appreciated that although the electrical power grid 70 is described with respect to the flowline 28 and subsea production system 10, the electrical power grid 70 may also be disposed at or coupled to any alternative and viable source of energy. By way of example, the turbine 56 of the generator circuitry 40 may include a wind turbine. Accordingly, the electrical power grid 70 may improve efficiency of electrical power generation and delivery at offshore and/or subsea locations. For example, the electrical power grid 70 may improve electrical power generation and delivery efficiency by omitting redundant provision of the electrical power generated offshore to a land-based system (e.g., a land based VSD) and returning the electrical power to offshore/subsea locations for consumption of the motors 38.

It should be appreciated that the electrical power grid 70 may be entirely or partially disposed onshore. For example, an onshore or offshore VSD 42 may supply electrical power from the storage unit 72 to an onshore or offshore motor 38 and/or an onshore or offshore generator circuitry 40. Alternatively or additionally, the onshore VSD 42 may receive and/or adjust the electrical power of the onshore or offshore motor 38 and/or the onshore or offshore generator circuitry 40.

In some cases, the electrical power grid 70 may have reduced transmission lines lengths between the motor 38, the VSD 42, and/or the generator circuitry 40 compared to other electrical power grids. The reduced transmission line lengths may be based on using the VSD 42 with both of the motor 38 and the generator circuitry 40. For example, a distance between the motor 38 and the generator circuitry 40 may be reduced onshore and/or offshore based on providing and/or adjusting the electrical power by the VSD 42 coupled to the motor 38 and the generator circuitry 40. Accordingly, the electrical power grid 70 may have an improved power delivery efficiency by 10% or more, 13% or more, 20% or more, and so on, among possibilities.

Figure 4:
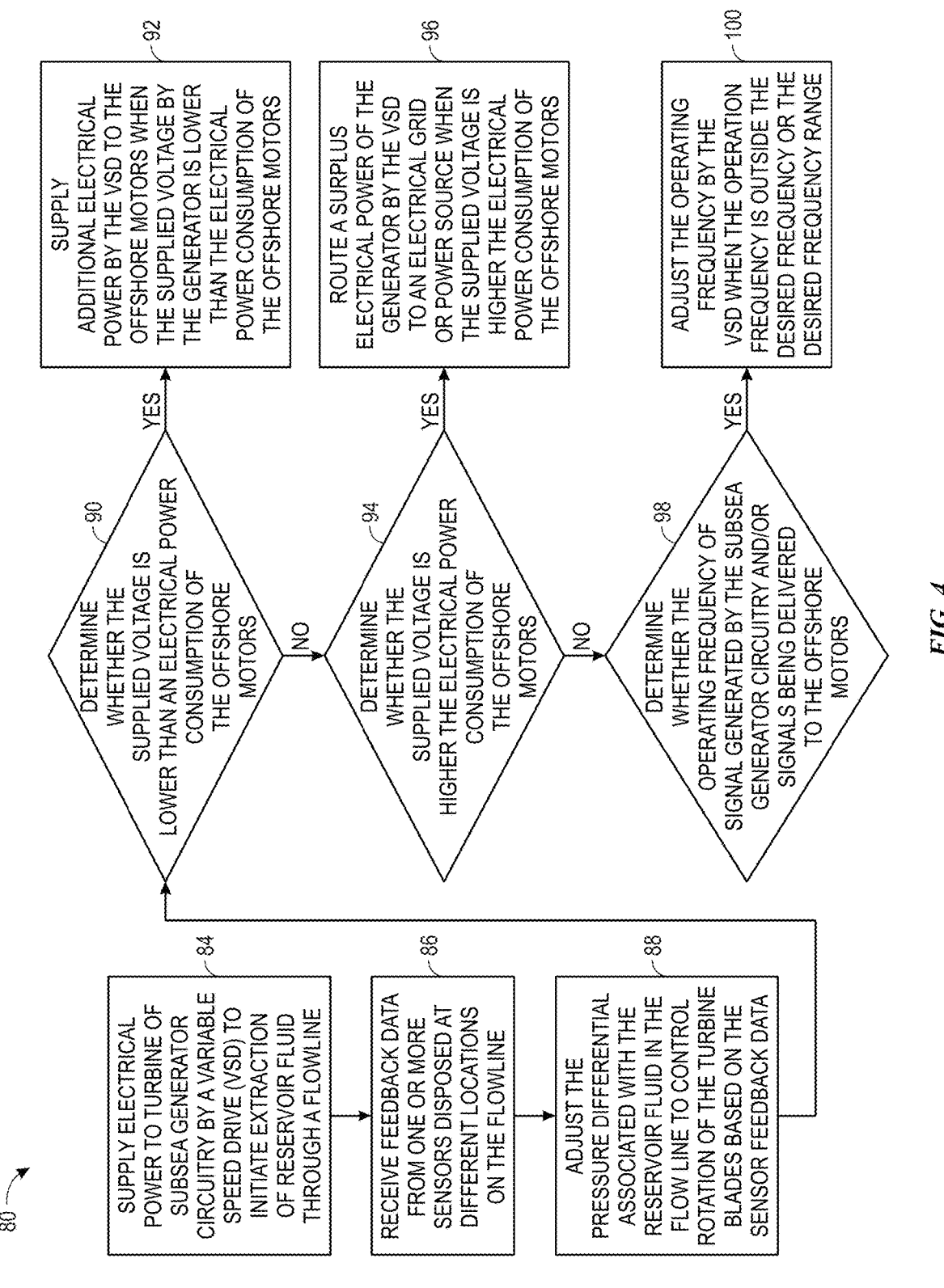
FIG. 4 is a flowchart of an example process to harness the potential energy of the pressure differential in a flowline by the offshore electrical power grid of FIG. 3 of the subsea production system of FIGS. 1 and 2, according to embodiments of the present disclosure.

FIG. 4 is a flowchart of an example process 80 to harness the potential energy of the pressure differential in a flowline 28 by the electrical power grid 70 of the subsea production system 10, according to embodiments of the present disclosure. The process 80 may be described with respect to components and/or circuits discussed above with respect to FIGS. 1-3. For example, the control system 44 of the subsea production system 10 may generate control signals to carry out the process blocks of the process 80. Although the process blocks are described in specific order, it should be appreciated that the process blocks of the process 80 may be performed in other viable order. Moreover, in some embodiments, one or more of the process blocks may be omitted and/or additional process blocks may be performed.

In process block 84, the control system 44 may send a control signal to the VSD 42 to cause it to supply electrical power to the turbine 56 to initiate extraction of the reservoir fluid by operating as a compressor or a pump to provide an initial pressure and/or pressure differential. As such, the subsea station 18 (e.g., the subsea tree 14) may extract the reservoir fluid via one or more wells 22. The turbine 56, the subsea station 18, or one or more of the motors 38 (e.g., the turbine 56, subsea pumps) may direct the reservoir fluid to a surface platform 30 via one or more of the flowlines 28 and through the generator circuitry 40. In process block 86, the control system 44 may receive feedback data (e.g., control signals) from one or more sensors 66 disposed at different locations on the flowline 28.

In process block 88, the control system 44 may adjust the pressure differential in the flow line to control rotation of the turbine blades based on the sensor feedback data. For example, the control system 44 may adjust the pressure differential in the flow line by controlling the choke valve 54. The generator 58 of the generator circuitry 40 may generate electrical power based on the pressure differential across the turbine 56. The generator circuitry 40 may supply the electrical power to the motors 38 to perform the respective operations.

In process block 90, the control system 44 may determine whether the supplied voltage is lower than the electrical power consumption of the motors 38 and/or the low electrical power generation rate threshold. In process block 92, the control system 44 may send a control signal to the VSD 42 to cause it to supply the additional electrical power to the motors 38 when the supplied voltage by the generator 58 is lower than the electrical power consumption of the motors 38 and/or lower than the low electrical power generation rate threshold.

In process block 94, the control system 44 may determine whether the supplied voltage is equal to or above a high electrical power generation rate threshold, for example, when the supplied voltage is equal to or above the electrical power consumption of the motors 38 and/or the low electrical power generation rate threshold. The high electrical power generation rate threshold may correspond to or be higher than the electrical power consumption of the motors 38.

In process block 96, the control system 44 may send a control signal to the VSD 42 to cause it to route the surplus electrical power generated by the generator 58 to an electrical grid or power source when the supplied voltage is equal to or above the high electrical power generation rate threshold. The surplus electrical power may correspond to an amount of the electrical power production by the generator 58 that is higher than the amount of electrical power consumption of the motors 38 and/or the low electrical power generation rate threshold. In some cases, the storage unit 72 of the VSD 42 may store the surplus electrical power. Alternatively or additionally, the VSD 42 may provide the surplus electrical power to one or more external power grids.

In process block 98, the control system 44 may determine whether the operating frequency of the electrical power grid 70 associated with the electrical power production of the generator circuitry 40 and/or electrical power delivery to the motors 38 is outside the desired frequency or the desired frequency range. In process block 100, the control system 44 may send a control signal to the VSD 42 to cause it to adjust the operating frequency of the electrical power grid 70 associated with the electrical power production of the generator circuitry 40 and/or electrical power delivery to the motors 38 when the operation frequency is outside the desired frequency or the desired frequency range. For example, in different cases, the VSD 42 may output electrical power (e.g., reactive power) based on commands received from the control system 44 to match the operation frequency of the electrical power grid 70. The VSD 42 may reduce or increase a frequency of the signals generated by the generator circuitry 40 and/or the signals being delivered to the motors 38.

It should be appreciated that the control system 44 may receive control signals feedback from one or more sensors disposed at various locations of the subsea production system 10. Moreover, the control system 44 may generate control signals indicative of performing operations of the process blocks discussed above. Furthermore, the control system 44 may output the control signals to the subsea station 18, the VSD 42, the turbine 56, the generator 58, the motors 38, or any combination thereof, among other things to carry out the instructions.

The technical effects of the systems and methods described in the embodiments of FIGS. 1-4 include utilizing a turbine and a VSD with offshore motors to form an offshore electrical power grid. The offshore power grid may harness the potential energy of the pressure differential in a flowline 28 while compensating for power flow fluctuations. The offshore power grid may improve operations of a subsea production system by operating in isolation to supply the offshore motors disposed subsea or on a surface of the sea. Accordingly, the techniques described above improves efficiency of offshore and/or subsea electrical power generation systems the offshore grid 70 discussed above and/or any other viable offshore sources of energy (e.g., renewable sources of energy). The offshore power grid may also improve operations of a subsea production system by coupling to additional electrical power grids (e.g., external power grids, land-based power grids). For example, the offshore power grid may provide surplus electrical power to the additional electrical power grids and/or receive additional electrical power from the additional electrical power grids.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. § 112 (f). However, for any claims containing elements designated in any other manner, it is intended that such elements are not to be interpreted under 35 U.S.C. § 112 (f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An offshore electrical power grid system, comprising:
subsea generator circuitry comprising:
    a turbine configured to generate mechanical power based on a movement of a fluid;
    a valve configured to control the movement of the fluid; and
    a generator coupled to the turbine, wherein the generator is configured to generate electrical power based on the mechanical power;
an offshore motor coupled to the generator, wherein the offshore motor is configured to perform an operation based on the electrical power;
an offshore variable speed drive (VSD) coupled to the generator and the offshore motor, wherein the offshore VSD is configured to:
    drive the generator or the offshore motor; and
    receive a portion of the electrical power that corresponds to surplus electrical power, wherein the surplus electrical power corresponds to a difference between a first amount of electrical power being provided by the generator and a second amount of electrical power being consumed by the offshore motor;
and
a control system configured to:
    route the surplus of electrical power to one or more energy storage units via the offshore VSD in response to the first amount of electrical power being higher than the second amount of electrical power;
    supply energy from the one or more energy storage units to the offshore motor via the offshore VSD in response to the first amount of electrical power being lower than the second amount of electrical power; and
    adjust a position of the valve to cause the movement of the fluid to change based on the first amount of electrical power, the second amount of electrical power, or both.

2. The offshore electrical power grid system of claim 1, wherein the generator comprises a winding configured to generate the electrical power based on the mechanical power.

3. The offshore electrical power grid system of claim 1, wherein a flow rate of the fluid through the turbine is associated with a rate of mechanical power generation of the turbine.

4. The offshore electrical power grid system of claim 1, wherein the offshore motor is part of a compressor or a pump, wherein the compressor or the pump is configured to perform the operation.

5. The offshore electrical power grid system of claim 1, wherein the offshore VSD is configured to initiate electrical power generation of the subsea generator circuitry and the operation of the offshore motor by initially driving the generator or the offshore motor.

6. The offshore electrical power grid system of claim 1, wherein the offshore VSD is configured to adjust one or more frequencies of a voltage signal, a current signal, or both provided to the offshore motor based on the surplus electrical power generated by the generator.

7. The offshore electrical power grid system of claim 1, wherein the control system is configured to control operations of the subsea generator circuitry, the offshore motor, the offshore VSD, or any combination thereof.

8. The offshore electrical power grid system of claim 1, wherein the offshore VSD is configured to output the portion of the electrical power to an on-shore electrical power grid.

9. A subsea production system comprising:
a subsea station coupled to a well, wherein the subsea station is configured to extract fluid via the well;
a flowline coupled to the subsea station, wherein the flowline is configured to carry the fluid away from the subsea station;
subsea generator circuitry coupled to the flowline, wherein the subsea generator circuitry comprises:
    a turbine configured to generate mechanical power based on a movement of a fluid through the flowline;
    a valve configured to control the movement of the fluid; and
    a generator coupled to the turbine, wherein the generator is configured to generate electrical power based on the mechanical power;
an offshore motor coupled to the generator, wherein the offshore motor is configured to perform an operation based on the electrical power;
an offshore variable speed drive (VSD) coupled to the generator and the offshore motor, wherein the offshore VSD is configured to:
    drive the generator or the offshore motor; and
    receive a portion of the electrical power that corresponds to surplus electrical power, wherein the surplus electrical power corresponds to a difference between a first amount of electrical power being provided by the subsea generator circuitry and a second amount of electrical power being consumed by the offshore motor; and
a control system configured to:
    route the surplus of electrical power to one or more energy storage units via the offshore VSD in response to the first amount of electrical power being higher than the second amount of electrical power;
    supply energy from the one or more energy storage units to the offshore motor via the offshore VSD in response to the first amount of electrical power being lower than the second amount of electrical power; and

adjust a position of the valve to cause the movement of the fluid to change based on the first amount of electrical power, the second amount of electrical power, or both.

10. The subsea production system of claim 9, wherein the offshore VSD is configured to output the surplus electrical power to a second offshore electrical power grid or an on-shore electrical power grid.

11. The subsea production system of claim 9, comprising a surface platform coupled to the flowline.

12. A tangible, non-transitory, computer-readable media storing instructions that, when executed by a processor, causes the processor to:

determine whether a rate of electrical power generation of subsea generator circuitry is higher than a high electrical power generation rate threshold or is lower than a low electrical power generation rate threshold;

receive an indication that a portion of electrical power being generated by the subsea generator circuitry corresponds to surplus electrical power based on the rate of electrical power generation of the subsea generator circuitry being higher than the high electrical power generation rate threshold, wherein the portion of the electrical power being generated corresponds to a difference between a first amount of electrical power being generated by the subsea generator circuitry and a second amount of electrical power being consumed by an offshore motor;

send a signal to an offshore variable speed drive (VSD) to cause the offshore VSD to supply the surplus electrical power to one or more energy storage units based on the rate of electrical power generation of the subsea generator circuitry being higher than the high electrical power generation rate threshold; and adjust a position of a valve to cause movement of a fluid through a turbine to change based on the first amount of electrical power, the second amount of electrical power, or both, wherein the turbine is part of the subsea generator circuitry.

13. The tangible, non-transitory, computer-readable media of claim 12, wherein the instructions cause the processor to initiate electrical power generation of the subsea generator circuitry by adjusting the position of the valve to start the movement of the fluid through to the turbine of the subsea generator circuitry.

14. The tangible, non-transitory, computer-readable media of claim 13, wherein the instructions cause the processor to:

determine whether an operating frequency of the electrical power being generated by the subsea generator circuitry or being delivered to the offshore motor is outside a desired frequency range; and adjust the operating frequency of the electrical power being generated or being delivered based on determining that the operating frequency is outside the desired frequency range.

15. The tangible, non-transitory, computer-readable media of claim 12, wherein the instructions cause the processor to cause the offshore VSD to output an additional portion of the surplus of electrical power being generated to an external power grid.

16. The offshore electrical power grid system of claim 1, wherein the valve comprises a choke valve.

17. The offshore electrical power grid system of claim 1, wherein the valve is configured to control an additional movement of the fluid via a flowline comprising the valve.

18. The offshore electrical power grid system of claim 17, wherein the flowline is positioned in parallel with an additional flowline configured to couple to the turbine.

19. The offshore electrical power grid system of claim 17, wherein the control system is configured to:

receive sensor data from one or more sensors associated with the flowline; and determine the position of the valve based on the sensor data.

20. The offshore electrical power grid system of claim 19, wherein the position is determined based on:

the sensor data; and a low-pressure threshold, a low-pressure differential threshold, a high-pressure threshold, a high-pressure differential threshold, or any combination thereof.

\*   \*   \*   \*   \*